June 28, 1955  S. CONOSCENTE ET AL  2,711,770
TRACTION DEVICE FOR VEHICLE WHEEL
Filed April 2, 1952  2 Sheets-Sheet 1

INVENTORS.
Salvatore Conoscente
Christopher B. Shickluna
BY Popp and Sommer
ATTORNEYS June 28, 1955   S. CONOSCENTE ET AL   2,711,770
TRACTION DEVICE FOR VEHICLE WHEEL
Filed April 2, 1952   2 Sheets-Sheet 2
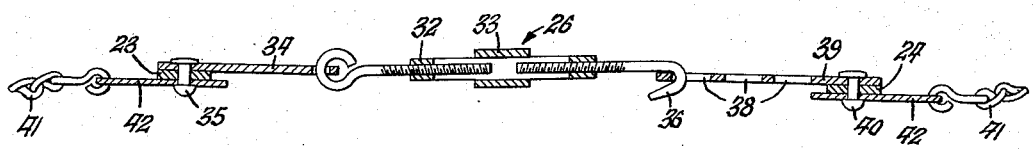
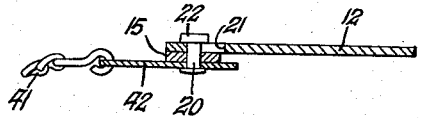
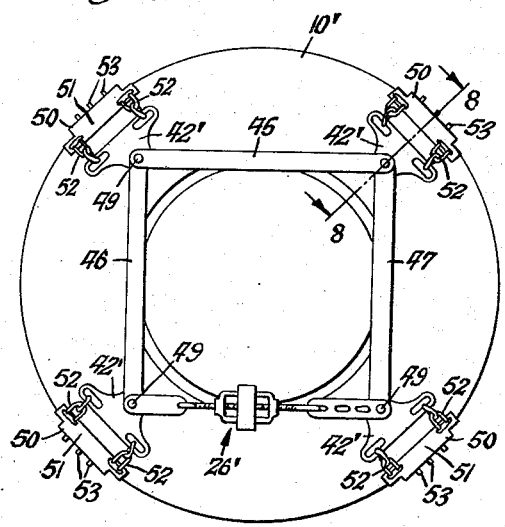
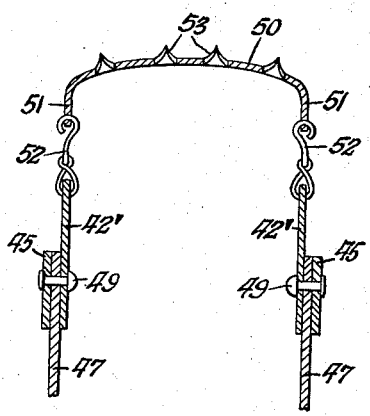
INVENTORS.
Salvatore Conoscente
Christopher B. Shickluna
BY Popp and Sommer
ATTORNEYS.

United States Patent Office 2,711,770
Patented June 28, 1955

2,711,770

TRACTION DEVICE FOR VEHICLE WHEEL

Salvatore Conoscente and Christopher B. Shickluna, Buffalo, N. Y.; said Shickluna assignor to said Conoscente Application April 2, 1952, Serial No. 280,004

2 Claims. (Cl. 152—242)

This invention relates to improvements in a traction device removably mountable on a vehicle wheel and is directed to that class of devices which includes what are commonly called skid-chains and mud-hooks and which are mounted on one or more power driven wheels of passenger and commercial automobiles, trucks, and the like to improve traction of the wheel through mud and snow and also to prevent skidding on icy surfaces.

The principal object of the invention is to provide a traction device which can be quickly and with a minimum of effort mounted on or removed from a vehicle wheel without requiring the wheel to be jacked up or rolled, as is generally required with conventional traction devices of this class.

Another object is to provide such a traction device which when mounted on a vehicle wheel has ground engaging elements which snugly embrace the periphery of the tire on the wheel at all times and which are maintained in substantially fixed circumferentially spaced relation.

Another object is to provide such a traction device which requires no modification of the vehicle wheel to mount the same thereon.

Another object is to provide such a traction device which can be readily adjusted to fit different sizes of tires.

A further aim is to provide such a traction device which folds up into compact form when removed from the vehicle wheel.

A further aim is to provide such a traction device which is sturdily constructed to withstand the abusive use to which devices of this class are subjected and yet is relatively light weight and simple in design.

Other objects and advantages of the invention will be apparent from the following description and drawings wherein:

Fig. 5 is an enlarged fragmentary sectional view of one of the adjustable links shown in Fig. 2, this view being taken on line 5—5, Fig. 2.

Fig. 6 is an enlarged fragmentary sectional view of the means providing a separable connection on the inside ring of the device, this view being taken on line 6—6, Fig. 3.

Fig. 7 is a view similar to Fig. 2 and showing a modified construction of traction device embodying the present invention.

Fig. 8 is an enlarged transverse sectional view thereof and taken on line 8—8, Fig. 7.

The numeral 10 represents a conventional pneumatic tire mounted on the usual rim of a vehicle wheel 11.

The traction device embodying the present invention is shown as having inner and outer rings arranged on the corresponding sides of the vehicle wheel 11 inwardly of the periphery of the tire 10 thereon, and ground engaging elements embracing the tire at spaced intervals circumferentially thereof and connected to the inner and outer rings.

Figure 1:
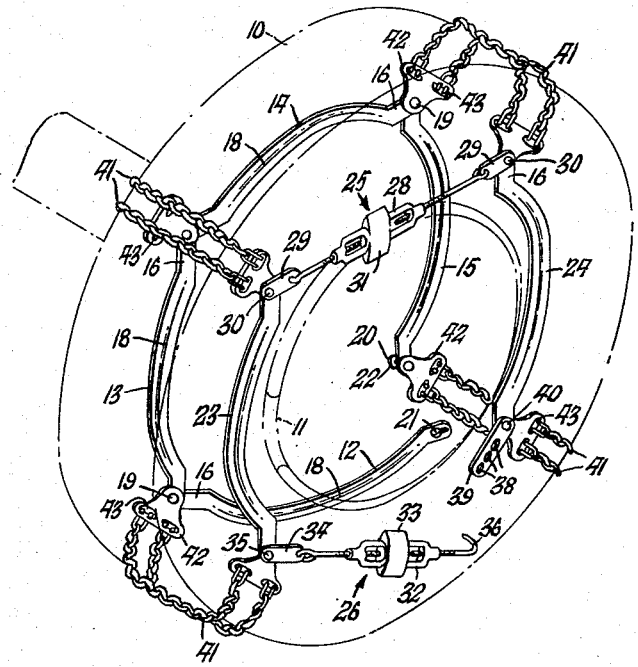
Fig. 1 is a perspective phantom view of a vehicle wheel and showing in full lines a traction device embodying the present invention mounted thereon, the ends of the device being shown disconnected.
Figure 4:
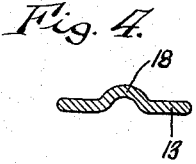
Fig. 4 is an enlarged transverse sectional view of one of the links shown in Fig. 3, this view being taken on line 4—4, Fig. 3.
Figure 2:
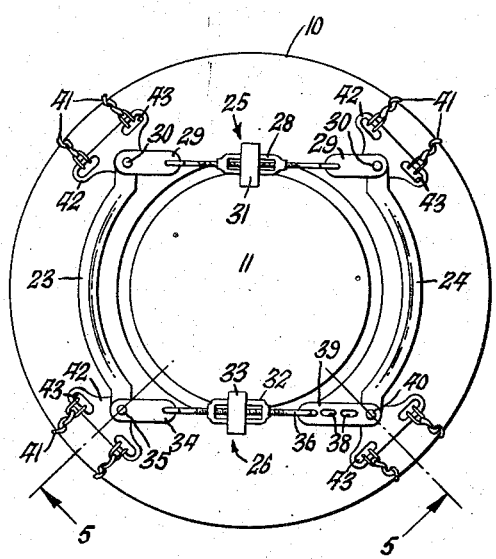
Fig. 2 is an elevational face view of the outside of the wheel and traction device shown in Fig. 1 and showing the ends of the device connected.
Figure 3:
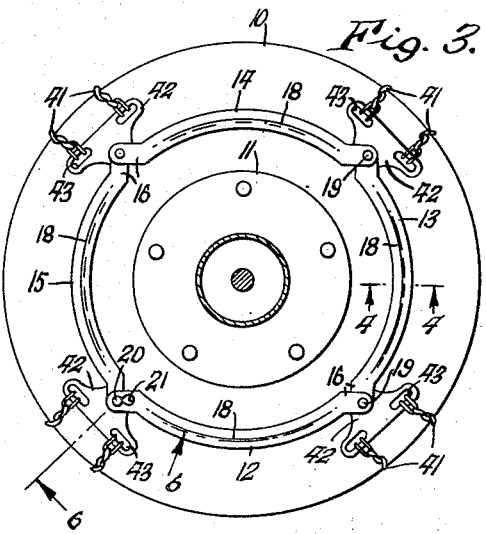
Fig. 3 is similar to Fig. 2 but a view of the inside of the wheel and traction device.

The inner ring is shown as comprising a plurality of links, preferably four in number as shown. These links are designated by the numerals 12, 13, 14 and 15 and are pivotally connected together in end to end fashion. Each of these links as shown is a flat strip formed with an arcuate central portion and an outwardly turned ear 16 at each end thereof which lies in the plane of the strip. The arcuate central portion of each link has a reinforcing bead 18 as shown for the link 13 in Fig. 4. Pivot pins 19 which may be in the form of rivets pivotally connect the overlapping ends of the links 12—13, 13—14 and 14—15. A separable connection is provided for the ends of the links 12—15, the same comprising an outwardly extending pin 20 carried by the end 16 of the link 15 and adapted to fit in a slot 21 in the end 16 of the link 12, as best shown in Fig. 6. The inner end of this slot is enlarged to permit the enlarged head 22 on the outer end of the pin 20 to pass therethrough and thus permit connection and disconnection of the two links 12 and 15 as illustrated in Fig. 1.

The outer ring is shown as also comprising four links which are arranged on the outside of the tire in opposition to the corresponding inner links. Two opposed links 23 and 24 in the outer ring are similar to each other and to the inner links 13 and 14. The other two opposed links 25 and 26 making up the remaining members of the outer ring are adjustable in length and the ends of the links 26 and 24 are disconnectible. The adjustable link 25 is permanently and pivotally connected to the corresponding ends of the links 23 and 24 and comprises a turnbuckle device 28 suitably connected at opposite ends to a fastening link 29 which in turn is pivotally connected to the corresponding end of the link 23 or 24 by a pivot pin 30. For convenience in turning the box-frame of the turnbuckle device 28, such frame has centrally arranged thereon an enlargement 31 which has portions extending outwardly from the frame to provide turning levers.

The adjustable link 26 is substantially similar in construction to its companion 25. Thus it has a turnbuckle device 32 with manipulating enlargement 33 and with one end connected to a fastening link 34 which in turn is pivotally connected to the corresponding end of the link 23 by means of the pivot pin 35. However, the other end of the turnbuckle device 32 is formed with a hook 36 adapted to be engaged in any one of a series of holes 38 arranged in a row in a fastening link 39. The end of this fastening link 39 is pivotally connected to the corresponding end of the link 24 by the pivot pin 40.

It will be noted that all connections between adjacent links in both rings are normally non-separable except at the connection involving the pivot pin 20 in the inner ring and at the hook and eye connections 36, 38 in the outer ring.

Ground engaging elements are shown as embracing the periphery of the tire 10 transversely thereof and connected to the inner and outer rings. In Figs. 1–6, such ground engaging elements are shown as lengths of chain 41 which may be of any suitable type such as the conventional type of link chain employed in conventional skid-chains. The chains 41 are shown as grouped in relatively closely spaced pairs and four such pairs are shown. Any number of chain lengths 41 may be employed as desired. The ends of each chain 41 are suitably connected to plates 42. Each such pivot plate 42 is shown as being of general T-shape and having its cross part provided with a pair of openings 43 in which the end link of the corresponding chain length 41 is hooked. The free end of the leg part of the T-shaped plate 42 is connected to the corresponding one of the pivot pins 19, 22, 30, 35 and 40. These plates 42 have pivotal movement about the axes of these pivot pins relative to the inner and outer rings so that the chains are self accommodating or adjusting to the tire.

When the traction device shown in Figs. 1–6 is to be applied to the tire 10 on the vehicle wheel 11, the inner links 12, 15 and outer links 26, 24 are disconnected. The jointed assembly is then pulled over the tire until the various parts assume the position shown in Fig. 1. Thereafter, the inner link 12 is connected to the adjacent inner link 15 by registering the enlarged head 22 of the pivot pin 20 with the enlarged inner end of the slot 21 in the link 12. Thereafter the link 12 is moved circumferentially away from the pivot pin 20 so that this pin moves toward the narrower outer end of the slot 21. In this manner the inner ring is connected.

In order to connect the outer ring, the adjustable link 26 is first lengthened, this being done by turning the turnbuckle 32 so as to spread its opposite ends. Thereafter the hook 36 is inserted in one of the holes 38 in the fastening link 39 and the turnbuckle 32 turned in the opposite direction so as to draw its opposite ends together. This shortens the overall length of the adjustable link 26 and pulls the various chains 41 tight to the periphery of the tire. During mounting of the traction device, the adjustable link 25 may also be first loosened to facilitate arrangement of the device around the tire and thereafter tightened. However, the adjustment of the adjustable link 25 is usually not required where the device is always used on the same size tire.

It will be noted that by tightening the adjustable link 26 this tends to pull or urge the four pivot pins 30, 35 and 40 in the outer ring inwardly in a radial direction relative to the axis of rotation of the wheel. This acts in turn through the ground engaging elements 41 to pull or urge the four pivot pins 19, 20 in the inner ring outwardly in a radial direction relative to the said wheel axis. In this manner maintenance of the pivot pin 20 in the narrow outer part of the slot 21 is assured when the traction device is finally adjusted for vehicle movement.

When mounting the device on a tire of larger or smaller size than that on which the traction device is normally used, the adjustable link 25 is adjusted either to enlarge or shorten its effective length and a similar type of adjustment is made with the turnbuckle 32 in the adjustable link 26. The hook 36 of this latter adjustable link is inserted into that one of the series of holes 38 in the fastening link 39 which best suits the connection of the hook for the particular size of tire on which the traction device is mounted.

To remove the traction device from the tire, the procedure explained above is reversed. That is, the turnbuckle 32 of the adjustable link 26 is turned so as to loosen the engagement between the hook and fastening link 39 to such an extent that the hook can be disengaged. Thereafter the inner links 12 and 15 are disconnected and the traction device stripped from the tire.

It will be noted that both in mounting and demounting the traction device the vehicle wheel does not have to be jacked up or rolled on the traction device and this constitutes an important feature of the invention inasmuch as it facilitates use of the traction device.

Figs. 7 and 8 show a modified form of traction device which is employed in the same manner as described in connection with the form shown in Figs. 1–6. In Fig. 7 which illustrates the outer ring of the traction device, such ring eliminates the outer link corresponding to the adjustable link 25 in the preferred form of the invention and substitutes a straight link of fixed length represented by the numeral 45. The ends of this link 45 are pivotally connected to similar straight links 46 and 47 and the ends of these latter links are connected by an adjustable link 26' which corresponds in construction and function with the adjustable link 26 in the preferred form of the invention.

The various links 45, 46, 47 and 26' are connected at their meeting ends by pivot pins 49 which also connect these links to plates 42' which correspond to the same plates 42 in the preferred form of the invention.

Each of the ground engaging elements shown in the modified form of the invention illustrated in Figs. 7 and 8 comprises a C-shaped plate having a transverse portion 50 engaging the periphery of the tire 10' and inwardly turned ends 51. These ends 51 are connected by means of hooks 52 of any suitable form to the outer ends of the plates 42'. The transverse part 50 of each ground engaging element is provided with outwardly projecting spikes 53 which are preferably formed by striking the same out of the body of the material constituting the transverse part 50.

Of course, the ground engaging elements shown in Figs. 7 and 8 can be used in substitution for the chain lengths 41 shown in Figs. 1–6 and vice versa.

From the foregoing it will be seen that the present invention provides a simple, sturdy traction device for a tired wheel which can be readily and easily mounted on and removed from such wheel.

We claim:

1. A traction device for a vehicle wheel, comprising a series of rigid links pivotally connected together in end to end fashion to form an inner ring arranged on the inner side of the wheel and each of substantially the same effective length, a second series of links in equivalent number pivotally connected together in end to end fashion to form an outer ring arranged on the outer side of the wheel and each of substantially the same effective length with one another and with the links in said inner ring, at least one of said outer links being adjustable in length, the inner and outer links being arranged opposite to one another to provide companion pairs on opposite sides of the wheel, plates pivotally connected to said rings at the places of pivotal connection between adjacent links in each ring, ground engaging elements embracing the periphery of the wheel and extending transversely thereof and each connected at its opposite ends to a corresponding pair of said plates, and means providing a separable connection between two adjacent inner links and between the corresponding two adjacent outer links, the balance of the pivotal connections between adjacent links in both rings being normally non-separable.

2. A traction device for a vehicle wheel, comprising inner and outer rings arranged on opposite sides of said wheel, said inner ring including a plurality of rigid links having their ends overlapping and pivotally connected by pivot pins and each link being of substantially the same effective length, the pivot pin carried by one of said links being slidably arranged in a slot in the adjacent link and having an enlarged head movable through an enlarged portion at one end of said slot to provide a separable connection, said outer ring including links in the same number as in said inner ring and having their ends overlapping and pivotally connected by pivot pins and each link being of substantially the same effective length with one another and with the links in said inner ring, that one of said outer links opposite the inner link with said slot including a turnbuckle having a separable hook and eye connection at one end, a plate pivotally connected to each of said pivot pins in said rings, and ground engaging elements embracing the periphery of the wheel and extending transversely thereof and each connected at its opposite ends to a corresponding pair of said plates, all connections between adjacent links in both rings being normally non-separable except at said pivot pin provided with said enlarged head in said inner ring and at said hook and eye connection in said outer ring.

References Cited in the file of this patent

UNITED STATES PATENTS

| Number | Name | Date |
|---|---|---|
| 1,316,873 | Bernot | Sept. 23, 1919 |
| 1,370,293 | Dowell | Mar. 1, 1921 |
| 1,511,685 | Spiro | Oct. 14, 1924 |
| 1,925,037 | Hanson | Aug. 29, 1933 |
| 2,176,631 | Kunkle | Oct. 17, 1939 |
| 2,176,637 | Miller | Oct. 17, 1939 |
| 2,273,753 | Gelinas | Feb. 17, 1942 |
| 2,657,728 | Jackson | Nov. 3, 1953 |